United States Patent [19]

Gantzhorn, Jr. et al.

[11] Patent Number: 4,843,487
[45] Date of Patent: Jun. 27, 1989

[54] TAPE TRANSPORTING DEVICE

[75] Inventors: John E. Gantzhorn, Jr., Hockessin, Del.; Koichi Sota, Tokyo, Japan

[73] Assignee: Otari Electric Company, Ltd, Tokyo, Japan

[21] Appl. No.: 104,040

[22] Filed: Oct. 7, 1987

[30] Foreign Application Priority Data

Nov. 15, 1986 [JP] Japan .................................. 61-272594

[51] Int. Cl.[4] .......................... G11B 5/86; G11B 15/58
[52] U.S. Cl. ...................................... 360/17; 242/182
[58] Field of Search .................................. 360/15–17; 242/55, 55.16, 182; 226/97, 95, 171

Primary Examiner—Vincent P. Canney
Attorney, Agent, or Firm—Cushman, Darby & Cushman

[57] ABSTRACT

The present invention concerns a tape transporting device wherein mechanisms which can partially switch the master tape traveling direction have been established, and wherein a loop bin used for storing a master tape is established on a horizontal plane. As a result, the master tape exhibits no deformation attributable to gravity within said loop bin, and a since the copy tape can have a constant perpendicular or other angular orientation with respect to the master tape in the loop bin, the floor space needed for the tape transporting device can be minimized.

10 Claims, 7 Drawing Sheets

TAPE TRANSPORTING DEVICE

BACKGROUND OF THE INVENTION

1. Field of the Invention

The present invention concerns a tape transporting device used for transporting a magnetic tape. More specifically, the present invention concerns a tape transporting device used for duplicating a magnetic tape wherein transfer is carried out by intimately contacting a recorded magnetic tape and a blank magnetic tape.

2. Description of the Prior Art

There are two major techniques for duplicating magnetic tapes. One is a method wherein a recorded tape (hereafter referred to as a master tape) is played back and immediately recorded at realtime on a blank tape (hereafter referred to as a copy tape). The other is a method wherein a master tape is intimately contacted with a copy tape and heat or a magnetic filed is applied to an overlapping area to complete a transfer at speeds quicker than realtime (hereafter referred to as a transfer technique, method or contact printing). When magnetic tapes characterized by complicated recording patterns (e.g., video tapes, digital tapes, etc.) are mass duplicated, the transfer technique is the far more efficient of the two.

There are numerous conventional devices used for preparing magnetic tape duplicates by the transfer method. For example, when the device disclosed in U.S. Pat. No. 4,213,159 is employed, a master tape is transported as an endless loop, and with a copy tape being transported from one reel frame to another in such a way that the master tape will be pressed toward the copy tape in the middle of the traveling path, and the overlapping area is thermally transferred. If a master tape characterized by an endless loop is employed, as in the aforementioned case, the duplication efficiency can be further improved since it is unnecessary to rewind the master tape. Japanese Utility Model Application Publication No. Jikkai Sho 48[1973]-24722 notes a loop bin which stores an endless loop master tape.

When the aforementioned conventional tape transporting devices used for duplicating magnetic tapes are employed, however, master tapes are easily deformed, Most importantly, if a long master tape is used in the form of an endless loop, the master tape is stored in a zigzag configuration in a bin having a master tape inlet and outlet. The master tape is bent in a zigzag configuration inside the bin and is deformed at the bent segments due to gravity. If the master tape is thus deformed, the recording pattern transferred onto the copy tape is negatively affected accordingly.

OBJECTS AND SUMMARY OF THE INVENTION

The foremost objective of the present invention is to provide a tape transporting device which prevents a master tape from deforming. This objective has been achieved in the present invention.

In accordance with the present invention, there is provided a tape transporting device for transporting a copy tape between a pair of reel frames close to a master tape characterized by an endless loop. There is provided a feeding reel frame for feeding the copy tape, a winding reel frame for winding the copy tape which is fed from the feeding reel frame, a backup roller for supporting the copy tape close to the master tape, the frames and roller for transporting an edge of the tapes in substantially a first plane, first and second directional switch means for switching the plane of transport of the master tape edge, and a loop bin for storing a portion of the master tape in a zigzag configuration and transporting the master tape edge substantially in a second plane.

In accordance with one embodiment of the present invention, rotational axes of the feeding reel frame, the winding reel frame, and the backup roller are configured substantially parallel to the loop bin or substantially perpendicular to a flat side of the master tape in the loop bin.

In accordance with another embodiment, the rotational axes of the feeding reel frame, the winding reel frame, and the backup roller are configured at an angle to the loop bin.

DESCRIPTION OF THE PREFERRED EMBODIMENT(S)

Figure 1:
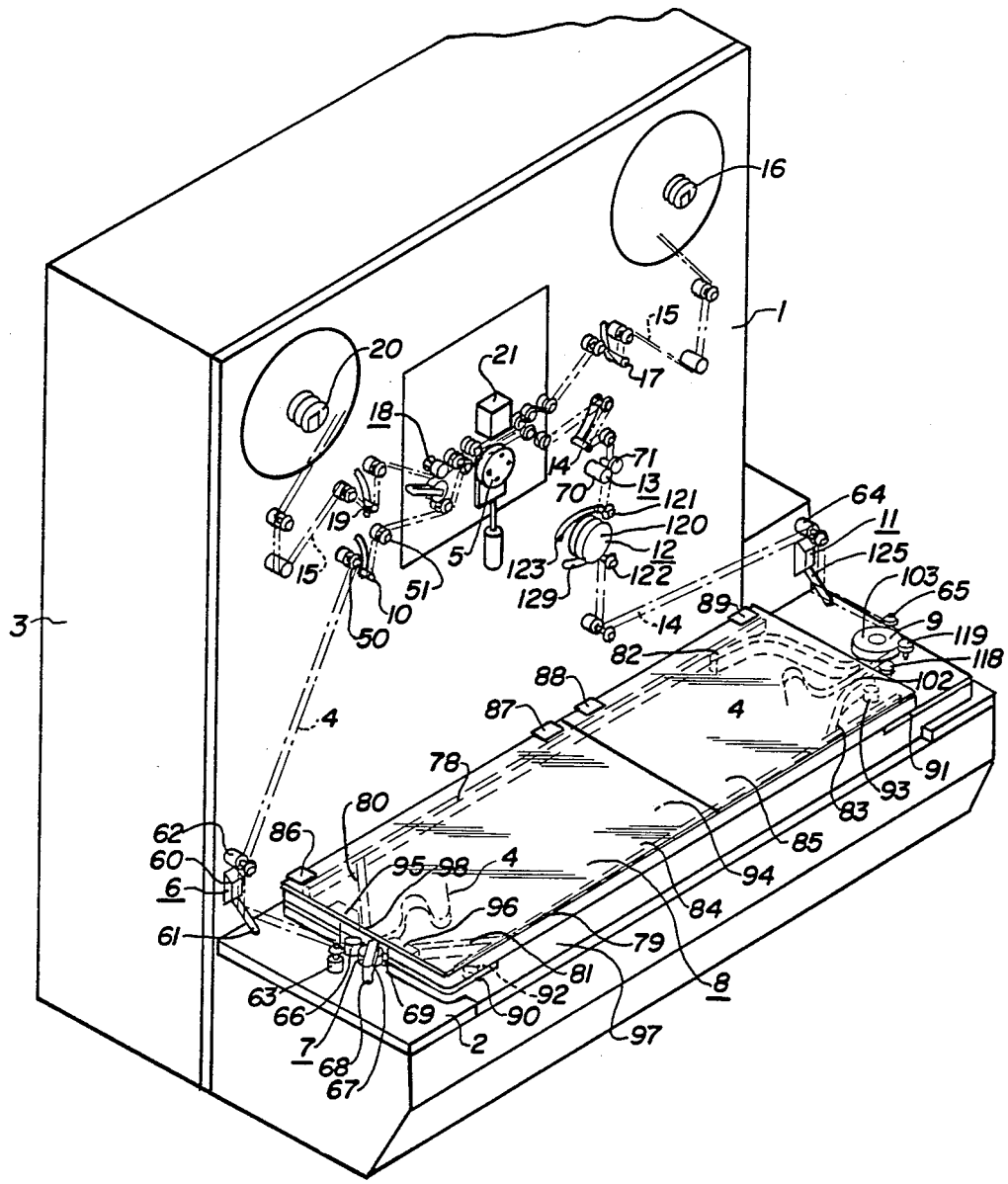
FIG. 1 is a simplified oblique view of the preferred embodiment of the present invention.

FIG. 1 illustrates the physical appearance of the main components of a preferred embodiment of the present invention. In the figure, (1) is a vertical panel base on which are mounted various elements to transport a copy tape (15) and a master tape (4). The master tape has an edge transported by the elements mounted on the vertical panel base (1) which travels generally in a first substantially vertical plane. (2) is a horizontal panel base on which is mounted a loop bin (8) to store and transport a portion of the master tape (4). The master edge is transported in the loop bin (8) generally in a second plane. In the FIG. 1 embodiment, the second plane is substantially horizontal. In FIG. 1, the vertical panel base (1) is interfaced with the horizontal panel base (2) substantially perpendicularly, and both panel bases ar mounted on a frame (3). The master tape (4) travels via a backup or transfer roller (5) having a rotational axis substantially parallel to the floor, a first tension arm (10), a first directional switch mechanism(6), a first tension control mechanism (7), the loop bin (8), a first tension application mechanism (9), a second directional switch mechanism (11), a second tension application mechanism (12), a second tension control mechanism (13), and a second tension arm (14). The first and second directional switch mechanisms change the plane of travel of the master tape edge. The copy tape (15) is transported from a feeding reel frame (16) having a rotational axis substantially parallel to the floor in the form of a long feed roll (not indicated in the figure). The copy tape (15) travels via a third tension arm (17), the backup or transfer roller (5), a drive mechanism (18), and a fourth tension arm (19), and it is finally wound around a winding reel (not indicated in the figure) mounted on a winding reel frame (20) having a rotational axis substantially parallel to the floor.

Figure 2:
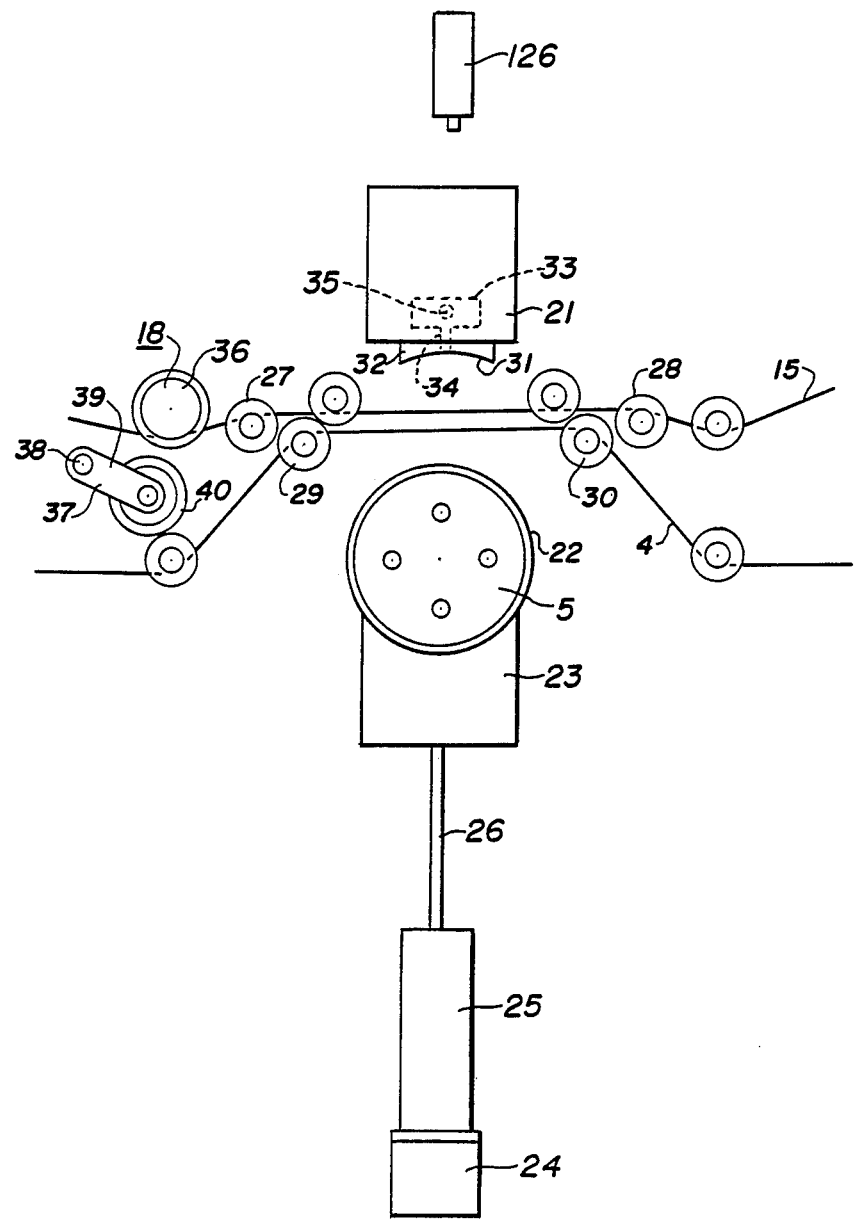
FIG. 2 is a front view of a contact printing station comprising a roller and air cap in an inactive position.

FIG. 2 illustrates parts of a tape contact printing station in detail. The printing station comprises an energy applying means (126) and a pressure applying means. The energy applying means can be a heat source, such as laser, or a magnetic field acting on tapes while they are pressed together under an air cap or restrainer (21). The pressure applying means comprises the backup or transfer roller (5) and the air cap or restrainer (21). The backup or transfer roller (5), which can be thrust both forward and backward with respect to the air cap or restrainer (21), is attached to the vertical panel base (1). FIG. 2 is a front view of the backup or transfer roller (5) and air cap or restrainer (21). The backup or transfer roller (5) is a cylinder having an axis and characterized by an outer circumference (22) of a width greater than that of the master tape (4) or copy tape (15); the outer circumference (22) can be freely rotated vis-a-vis a slide base (23). (25) is a cylinder. The cylinder (25) is attached to the vertical panel base (1) via an angle joint (24). A rod (26) of the cylinder (25) is interlocked with the slide base (23), and when the cylinder (25) is activated, the backup or transfer roller (5) can be transported either forward or backward vis-a-vis the air cap or restrainer (21). FIG. 2 pertains to a case where the backup or transfer roller (5) is extended from the air cap or restrainer (21). The air cap or restrainer (21) is established directly opposite the backup or transfer roller (5) in such a way that the copy tape (15), which is stretched between tape guides (27) and (28), and the master tape (4), which is stretched between tape guides (29) and (30), will be sandwiched in between the air cap or restrainer (21) and the backup or transfer roller (5). The air cap or restrainer (21) has an air outlet structure (32) which encompasses a curved area (31) characterized by a curvature virtually identical to that of the outer circumference (22) of the backup or transfer roller (5) directly opposite the backup or transfer roller (5). An air chamber or pressure equalizing cavity (33) is established within the air cap or restrainer (21), and the air chamber or cavity (33) is connected to the curved area (31) via an air slot or path (34). The air chamber or cavity (33) is connected to a high-pressure air source (not indicated in the figure) via a hole (35). When high-pressure air is supplied from the high-pressure air source into the air chamber or cavity (33) via the hole (35), the air is blown from the curved area (31).

In the system of FIG. 2, the drive mechanism (18) is composed of a capstan shaft (36), which is driven and rotated by a motor (not indicated in the figure), and a pinch roller (37). The pinch roller (37) is composed of a pinch roller arm (39), which can be rotated around an axle or shaft (38), and a rotatable roller (40), which can be freely rotated at a front end of the pinch roller arm (39). The rotatable roller (40) can be pressed toward the capstan shaft (36) by a rotating/driving mechanism (not indicated in the figure). When the rotatable roller (40) is pressed toward the capstan shaft (36), the copy tape (15) is inserted between said components.

Figure 3:
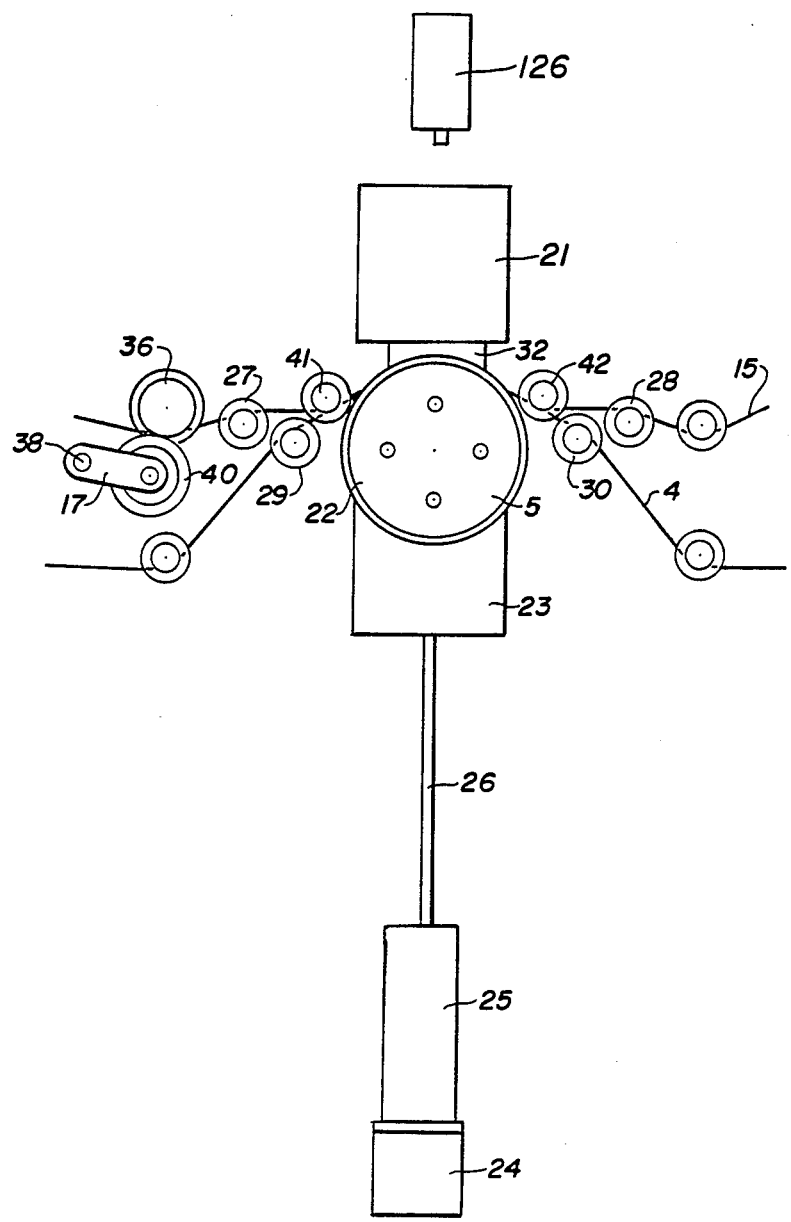
FIG. 3 is a front view of the roller and air cap in an active position.

FIG. 3 pertains to a case where the backup or transfer roller (5) indicated in FIG. 2 has shifted toward the air cap or restrainer (21) and the pinch roller (37) is synchronized with the capstan shaft (36) for the purpose of transporting the copy tape (15). When the backup or transfer roller (5) moves toward the air cap or restrainer (21), the copy tape (15) and master tape (4) are sandwiched between the backup or transfer roller (5) and the air outlet structure (32). As a result, the copy tape (15) is pressed close to the master tape (4) between tape guides (41) and (42). Furthermore, when air is blown from the air outlet structure (32), the copy tape (15) attaches firmly to the master tape (4) on the outer circumference (22) of the backup or transfer roller (5). The outer surface of the rotatable backup roller (5) acts to support both tapes and position them accurately with respect to the energy applying means as they are pressed together by the pressure from the air cap. Since the backup or transfer roller (5) can be freely rotated, if either the copy tape (15) or the master tape (4) is transported, the other automatically follows.

Figure 4:
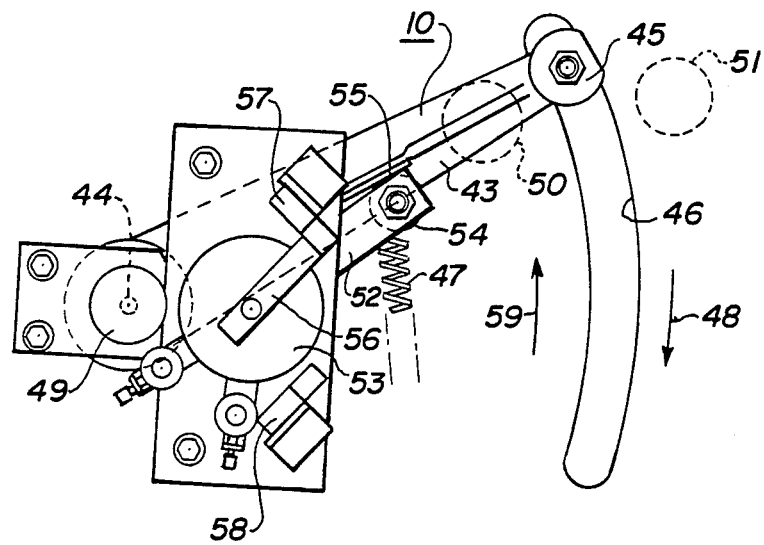
FIG. 4 is a back view of a first tension arm.

FIG. 4 shows the structure of the first tension arm (10) shown in FIG. 1. FIG. 4 illustrates a view of the tension arm (10) from behind the vertical panel base (1).

(43) is a swing arm. The swing arm (43) is attached to the vertical panel base (1) via an axle or shaft (44) and can also be rotated around the axle or shaft (44). A front guide (45), which guides the master tape (4), is attached to the other end of the swing arm (43). The front guide (45) projects out from the front surface of the vertical panel base (1) via a long hole (46) established through the vertical panel base (1). The front guide (45) moves within the long hole (46) in response to the rotation of the swing arm (43). The swing arm (43) is continuously pressed in the direction indicated by the arrow (48) by a tension spring (47). (49) is an angular position detector. The angular position detector (49) is attached to the axle or shaft (44) in a coaxial fashion, and it detects the angle of the swing arm (43). The master tape (4) is guided by the tape guides (50) and (51) attached to the front surface of the vertical panel base (1), so there is a correlation between the angle of the swing arm (43) of the tension arm (10) between the tape guides (50) and (51) and the tension of the master tape (4). Accordingly, there is a correlation between the output of the angular position detector (49) and the tension of the master tape (4). In FIG. 4, (52) denotes a shift arm. The shift arm (52) is driven and rotated by a rotatable actuator (53). A comb (54) is attached to the front end of the shift arm (52) and is interlocked with a comb receiver (55) attached to the swing arm (43). (56) is a detection panel which rotates in response to the rotation of the rotatable actuator (53). The rotation of the detection panel (56) can be detected by detectors (57) and (58), which are integrated with the vertical panel base (1). When the shift arm (52) is rotated in the direction indicated by the arrow (59), the swing arm (43) of the tension arm (10) is transported to the vicinity of the tape guides (50) and (52) in opposition to the force of the spring (47). When the shift arm (52) is rotated in the direction indicated by the arrow (48), it is unlocked from the swing arm (43), and as a result the tension arm (10) can detect the tension of the master tape (4).

The actions of the second tension arm (14), third tension arm (17), and fourth tension arm (19) shown in FIG. 1 need not be explained in detail since they are structurally identical to the first tension arm (10).

Next, the structure of the first directional switch mechanism (6) shown in FIG. 1 will be explained. The first directional switch mechanism (6) is composed of a base block (60), which is attached to the vertical panel base (1), and a guide shaft (61), which is supported by the base block (60) in such a way that the angle relative to the vertical base panel will be approximately 45°. The master tape (4) is guided by the tape guides (62) and (63). Rotational axes of the tape guides (62) and (63) form equal angles, in this case 45°, with a longitudinal axis of the guide shaft (61). While the master tape (4) is being transported via the tape guide (62), guide shaft (61), and tape guide (63), the traveling direction is switched by 90°. The structure of the second directional switch mechanism (11) is virtually identical with that of the first directional switch mechanism (6). In the aforementioned configuration, a tape guide (64) corresponds to the tape guide (62), a tape guide (65) corresponds to the tape guide (63), and a guide shaft (125) corresponds to the guide shaft (61). The positional relationship between tape guides (64) and (65) and shaft (125) is identical to that between tape guides (62) and (63) and shaft (61).

In FIG. 1, (7) denotes the first tension control mechanism. The first tension control mechanism (7) is composed of a capstan shaft (66), which is driven by a motor (not indicated in the figure), and a pinch roller (67). The pinch roller (67) can be rotated around an axle or shaft (68), and if necessary a rotatable roller (69) is pressed toward the capstan shaft (66). When the master tape (4) is inserted between the rotatable roller (69) and the capstan shaft (66), the tension of the master tape (4) can be regulated by controlling the rotation of the capstan shaft (66). The first tension control mechanism (7) controls the tension of the master tape (4) between the backup or transfer roller (5) and the first tension control mechanism (7) via the tension arm (10) on the basis of the tension of the master tape (4) detected by the first tension arm (10). When the tension of the master tape (4) is regulated by the first tension control mechanism (7), the master tape (4) is driven in such a way that the output signal of the angular position detector (49), which is attached to the tension arm (10), will remain constant.

The second tension control mechanism (13) is composed of a capstan shaft (70) and a pinch roller (71). Its structure may be identical to that of the first tension control mechanism (7). The second tension control mechanism (13) regulates the tension of the master tape (4) between the second tension control mechanism (13) and the backup or transfer roller (5) via the second tension arm (14) on the basis of the tension of the master tape (4) detected by the second tension arm (14).

Figure 5:
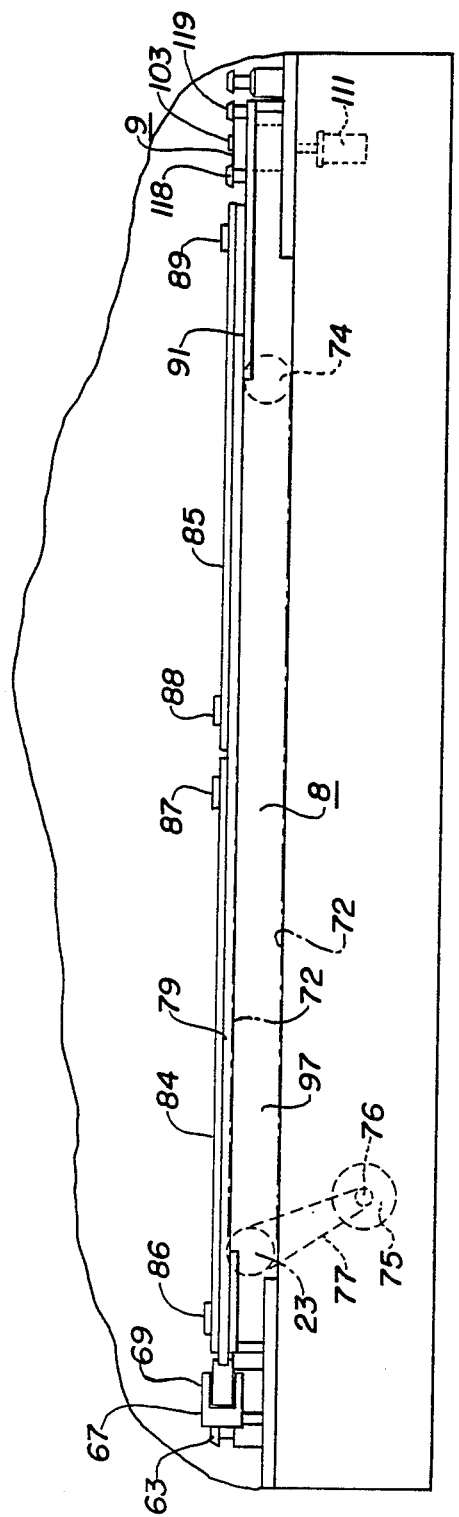
FIG. 5 is a front view of a horizontal loop bin.
Figure 6:
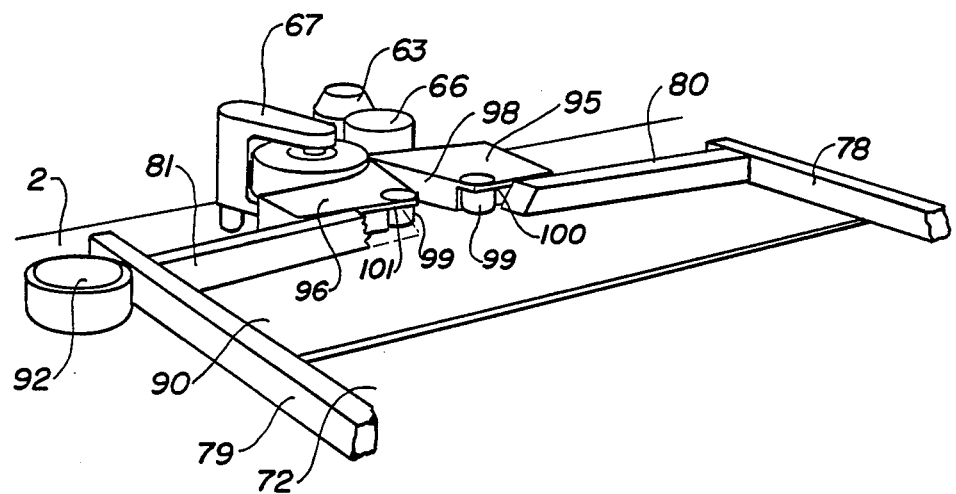
FIG. 6 is a magnification of part of the horizontal loop bin.

Next, the structure of the loop bin (8) will be explained with reference to FIGS. 1, 5, and 6. FIG. 5 pertains to a case where loop bin (8) and the vertical panel base (1) are configured on a horizontal plane. FIG. 6 is a partial interior view of the loop bin (8). In FIG. 5, (72) denotes a belt. The belt (72) is stretched between a pair of pulleys (73) and (74), its front and rear ends are connected to form an endless loop. (75) is a motor. An output axle or shaft (76) of the motor (75) is connected to the pulley (73) via a drive belt (77). The belt (72) is driven and rotated clockwise by the motor (75). In FIGS. 1 and 6, (78), (79), (80), (81), (82), and (83) are guide rails. The guide rails (78), (79), (80), (81), (82), and (83) are slightly higher than the master tape (4) is wide. (84) and (85) are glass panels. The glass panels (84) and (85) are supported on the horizontal base panel (2) via hinges (86), (87), (88), and (89) in such a way that the glass panels can be freely opened or closed. Furthermore, the glass panels are configured on a horizontal plane via a support block (97) and spacers (92) and (93), which are attached to the horizontal panel base (2) via support panels (90) and (91), respectively. The glass panels (84) and (85) completely cover a bin (94), which is defined by the guide rails (78), (79), (80), (81), (82), and (83). The belt (72) is located beneath the guide rails (78) and (79), and the width is slightly greater than the distance between the guide rails (78) and (79). In FIG. 1, (95) and (96) denote inlet blocks.

The inlet blocks (95) and (96) are connected to the guide rails (80) and (81), respectively, and an inlet (98) is formed between the inlet blocks (95) and (96). The inlet (98) is established in such a way that the master tape (4) which has been transported by the first tension control mechanism (7) will be guided into the bin (94). As FIG. 6 indicates, furthermore, outlet guides (100) and (101) containing numerous air holes (99) are established on the inlet blocks (95) and (96), respectively. High-pressure air is blown from the air holes (99) of the outlet guides (100) and (101) in such a way that the master tape (4) that is passed through the inlet (98) will not touch the edges of the inlet (98). As FIG. 1 indicates, furthermore, the guide rails (82) and (83) constitute an outlet (102) such that the master tape (4) can be smoothly retrieved from the bin (94). The loop bin (8) stores the long master tape (4) characterized by a magnetic tape in the bin (94) which has been introduced from the inlet (98), and the master tape (4) is transported to the outlet (102) by the belt (72). The speed of the belt (72) is slightly higher than the speed of the master tape (4) characterized by a magnetic tape in the bin (94) between the inlet (98) and outlet (102). As a result, the master tape (4) is characterized by a zigzag configuration "hang up" in the vicinity of the outlet (102), but since the master tape (4) slips on the belt (72), there is no significant compression of the master tape (4) in the vicinity of the outlet (102).

Figure 7:
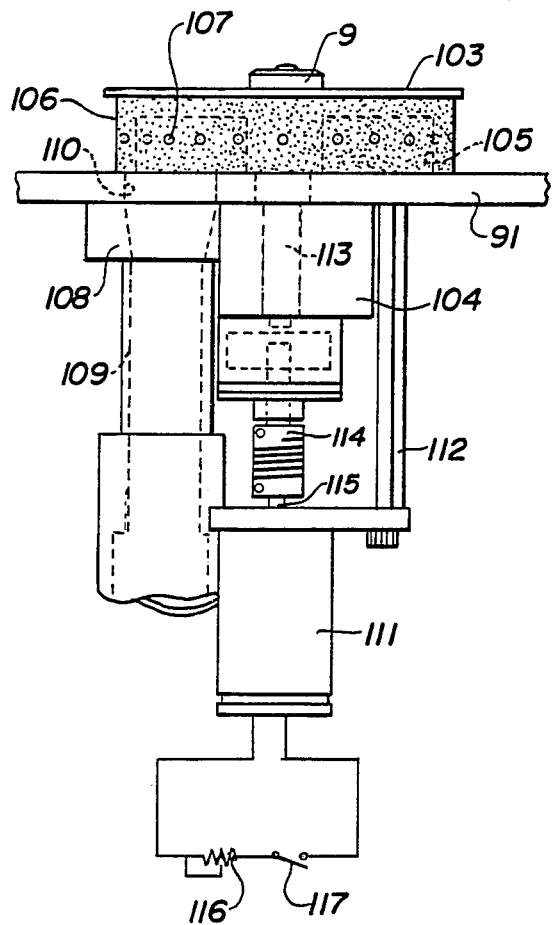
FIG. 7 illustrates a first tension application mechanism.

Next, the structure of the first tension application mechanism (9) will be explained with reference to FIGS. 1 and 7. (103) is a vacuum roller. The vacuum roller (103) is supported by a bearing (104), which is attached to the support panel (91), in a freely rotating position. An air chamber (105) is established within the vacuum roller (103). Numerous small holes (107) are formed on the surface (106) of the vacuum roller (103) in such a way that air can be passed through the air chamber (105) via the small holes (107). (108) is a tube. One end of the tube (108) is connected to the support panel (91), and the other end is connected to a suction mechanism (not indicated in the figure). A conducting path (109) of the tube (108) matches the hole (110) on the support panel (91).

When the master tape (4) is loaded on the surface (106) of the vacuum roller (103), the pressure of the air chamber (105) is reduced, and the master tape (4) is pressed toward the small holes (107) in such a way that the master tape (4) will not slip on the surface (106). (111) is an electrical power generator. The power generator (111) is attached to the support panel (91) via a stud (112). A shaft (113), which is coaxial to the vacuum roller (103), is connected to a shaft (115) of the power generator (111). A switch (117) and resistor (116) are attached to the power generator (111) as load mechanisms, and if the switch (117) and the resistor (116) are properly regulated, the rotational torque of the shaft (115) of the power generator (111) can be controlled. As a result, if the vacuum roller (103) is rotated by pulling the master tape (4) loaded on the vacuum roller (103), the tensile force resists the rotational torque of the shaft (115) of the power generator (111). Tape guides (118) and (119) shown in FIGS. 1 and 5 are used to guide the master tape (4); these guides are activated in such a way that the master tape (4) will be sufficiently pressed toward the vacuum roller (103).

Next, the structure of the second tension application mechanism (12) will be explained with reference to FIG. 1.

The second tension application mechanism (12) is composed of a load roller (120) and a pair of transporting guides (121) and (122). The load roller (120) is supported on the vertical panel base (1) in a freely rotatable position, and a coaxial load mechanism is connected to the load roller (120). This load mechanism may be composed of a fixed electromagnetic coil, a rotatable panel which rotates in response to the rotation of the load roller (120), and a magnetic powder filled into the gap between said electromagnetic coil and rotatable panel. If the current passed through the electromagnetic coil is regulated, the aforementioned load mechanism can control the braking torque applied to the rotatable panel and thereby the braking torque applied to the load roller (120) connected thereto.

The transporting guides (121) and (122) can be shifted along thin holes (123) and (124) which have been formed on the vertical panel base (1) around the load roller (120); said guides are capable of guiding the master tape (4). When the transporting guides (121) and (122) have moved into the position shown in FIG. 1, the master tape (4) is sufficiently pressed toward the load roller (120) in such a way that the master tape (4) will not slip on the load roller (120).

The feeding reel frame (16) is driven by a feeding reel motor (not indicated in the figure). The action of this component is regulated in such a way that the tension of the copy tape (15) detected by the third tension arm (17) will be kept constant. If the action of the feeding reel frame (16) is properly regulated, the tension of the copy tape (15) between the feeding reel frame (16) and the backup or transfer roller (5) via the third tension arm (17) can be effectively controlled.

The winding reel frame (20) is driven by a winding reel motor (not indicated in the figure). The action of this component is regulated in such a way that the tension of the copy tape (15) detected by the fourth tension arm (19) will be kept constant. If the action of the winding reel frame (20) is properly regulated, the tension of the copy tape (15) between the drive mechanism and the winding reel frame (20) via the fourth tension arm (19) can be effectively controlled.

As far as the present invention is concerned, the above-described embodiment shown in FIG. 1 can be modified in a variety of ways.

For example, the copy tape (15) can be driven by the drive mechanism (18), but it may be driven by the backup or transfer roller (5), the winding reel frame (20), the first tension control mechanism (7), or combinations thereof as well. Furthermore, the aforementioned embodiment pertains to a case where the loop bin (8) and vertical panel base (1) are configured perpendicular to one another, but it should be noted that the objectives of the present invention can be safely attained even if the configuration is not perpendicular.

For instance, in one alternate embodiment the vertical panel base (1) may remain vertical and the loop bin (8) may be inclined from the horizontal by 30°. The included angle between the panel base (1) and loop bin (8) would then be 90° plus 30° or 120°. The directional switch mechanisms would have to be adjusted accordingly. In this configuration, the master tape loops would be moved by the force of gravity to a position along the guide rail (79). The component of the vertically acting gravity force along the angle of 30°, however, would be small enough not to cause damaging deformation to the recording pattern on the master tape (4) that is to be transferred to the copy tape (15). In this configuration, the loops of the master tape (4) can be transported through the bin (8) by the belt (72) or, alternatively, belt (72) can be replaced by a smooth panel and a system of rollers and connecting belts (such as "o-rings") can replace guide rail (79). By driving these rollers and connecting belts along the edge of the loop bin (8) where the tape (4) is moved by gravity, the tape (4) loops can be transported through the bin (8) from the inlet (98) to the outlet (102).

In another embodiment, the front surface of the panel base (1) and the panel base (2) are oriented in the same plane (i.e., the included angle is 180°) and the plane is horizontal or inclined with 45° of horizontal. In this configuration, the directional switch mechanisms are not required since there is no change in the travel plane of the master tape edge. The master tape loops can be transported through the horizontal bin as previously described in the preferred embodiment, or transported through the inclined bin as just described in the alternate embodiment above. The tapes are transported along the panel base (1) in the same manner as when the panel base was vertical as described in the preferred embodiment.

In the device of the present invention, an endless loop master tape is stored in a horizontal loop bin. As a result, even if the master tape is characterized by a zigzag configuration within the loop bin, no excessive bending force is applied to the master tape. Furthermore, since only the loop bin need be characterized by a horizontal structure, a compact tape transporting device which does not occupy excessive floor space can be obtained.

We claim:

1. A tape transporting device for transporting a copy tape between a pair of reel frames close to a master tape characterized by an endless loop, comprising: a feeding reel frame for feeding the copy tape; a winding reel frame for winding the copy tape which is fed from the feeding reel frame; a backup roller for supporting the copy tape close to the master tape; the frames and roller for transporting an edge of the tapes in substantially a first plane: a loop bin for storing a portion of the master tape in a zigzag configuration and transporting the master tape edge substantially in a second, different plane; and directional switch means for switching the plane of transport of the edge of the master tape from said first plane to said second plane, and for switching the plane of transport of the edge of the master tape from said second plane to said first plane.

2. The device of claim 1 wherein said directional switch means comprises a first direction switch mechanism for switching the orientation of the edge of the master tape from said first plane to said second plane, and a second direction switch mechanism for switching the orientation of the edge of said master tape from said second plane to said first plane.

3. The device as set forth in claim 2, wherein the second plane is substantially horizontal.

4. The device as set forth in claim 2, wherein the first plane is substantially vertical.

5. The device as set forth in claim 3, wherein the first plane is substantially vertical.

6. A tape transporting device for transporting a master tape having an edge and a flat side, the master tape including an endless loop, comprising:

a contact printing station for duplicating tapes including:
 a backup roller means having an axis,
 means for applying pressure such that the flat side of the master tape contacts a flat side of a copy tape, and
 means for applying energy to at least one of the tapes;
storage means for forming and storing in a zigzag configuration at least a portion of the master tape, the improvement comprising:
 at least one means adjacent the storage means to switch the travel path of the master tape from an orientation such that the flat side of the master tape is substantially parallel to the backup roller axis to an orientation such that the flat side of the master tape is substantially vertical and substantially perpendicular to the backup roller axis, and the storage means for storing the master tape with the master tape supported on the tape edge.

7. The device in accordance with claim 6, wherein the storage means further comprises tape inlet means to direct a portion of the master tape therein and tape outlet means to withdraw a portion of the master tape therefrom and means to transport the zigzag configuration from the inlet means to the outlet means.

8. The device in accordance with claim 7, wherein there are at least two means to switch the travel path of the master tape, one adjacent the inlet means and one adjacent the outlet means of the loop bin.

9. In a tape transporting device wherein a copy tape travels between a pair of reel frames and is transported close to a master tape characterized by an endless loop, the device comprising: a feeding reel frame which feeds the copy tape, a winding reel frame which winds the copy tape which has been fed from the feeding reel frame, a transfer roller which supports the copy tape close to the master tape, the frames and roller being mounted on a supporting surface defining a first plane; a loop bin position in a second plane substantially perpendicular to said first plane for storing the master tape on its edge in a zig-zag configuration, and directional switch means for switching the orientation of the edge of the master tape from said first plane to said second plane and from the second plane to said first plane.

10. The device of claim 9 wherein said directional switch means comprises a first direction switch mechanism for switching the orientation of the edge of the master tape from said first plane to said second plane, and a second direction switch mechanism for switching the orientation of the edge of said master tape from said second plane to said first plane.

* * * * *